May 25, 1965    N. A. VANDERLOOP    3,185,326
MATERIAL HAULING, MIXING AND SPREADING DEVICE
Filed Jan. 8, 1963    3 Sheets-Sheet 1
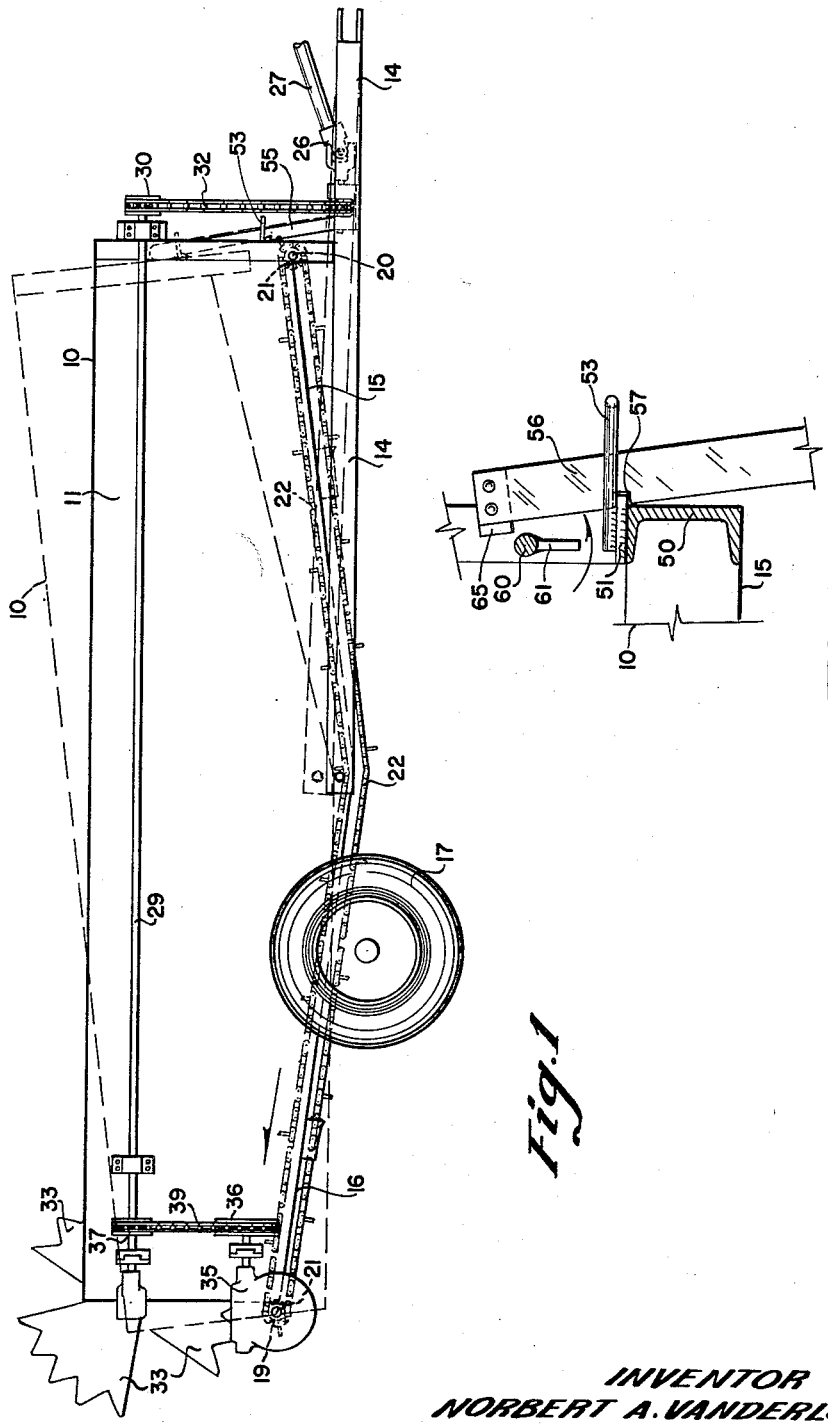
INVENTOR
NORBERT A. VANDERLOOP
BY M. Talbert Dick
ATTORNEY
WITNESS
NORMAN G. TRAVISS

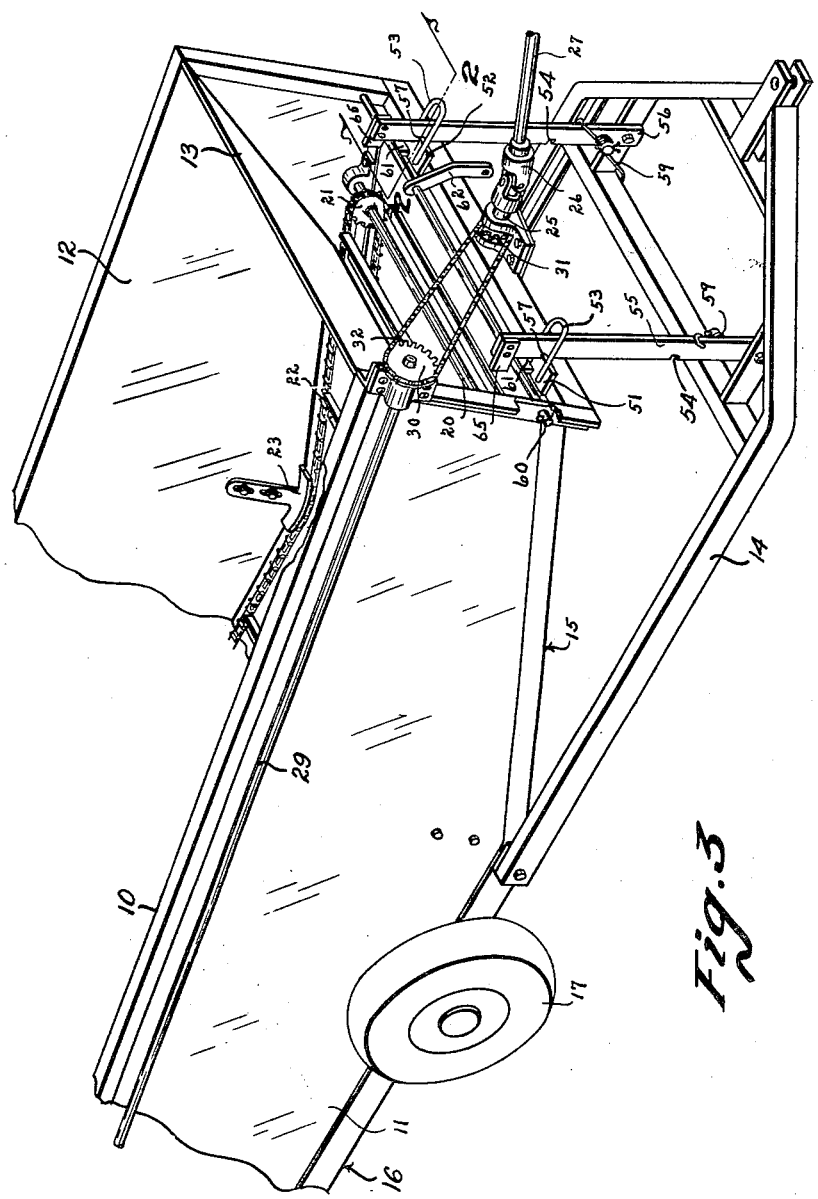

May 25, 1965    N. A. VANDERLOOP    3,185,326
MATERIAL HAULING, MIXING AND SPREADING DEVICE
Filed Jan. 8, 1963    3 Sheets-Sheet 3
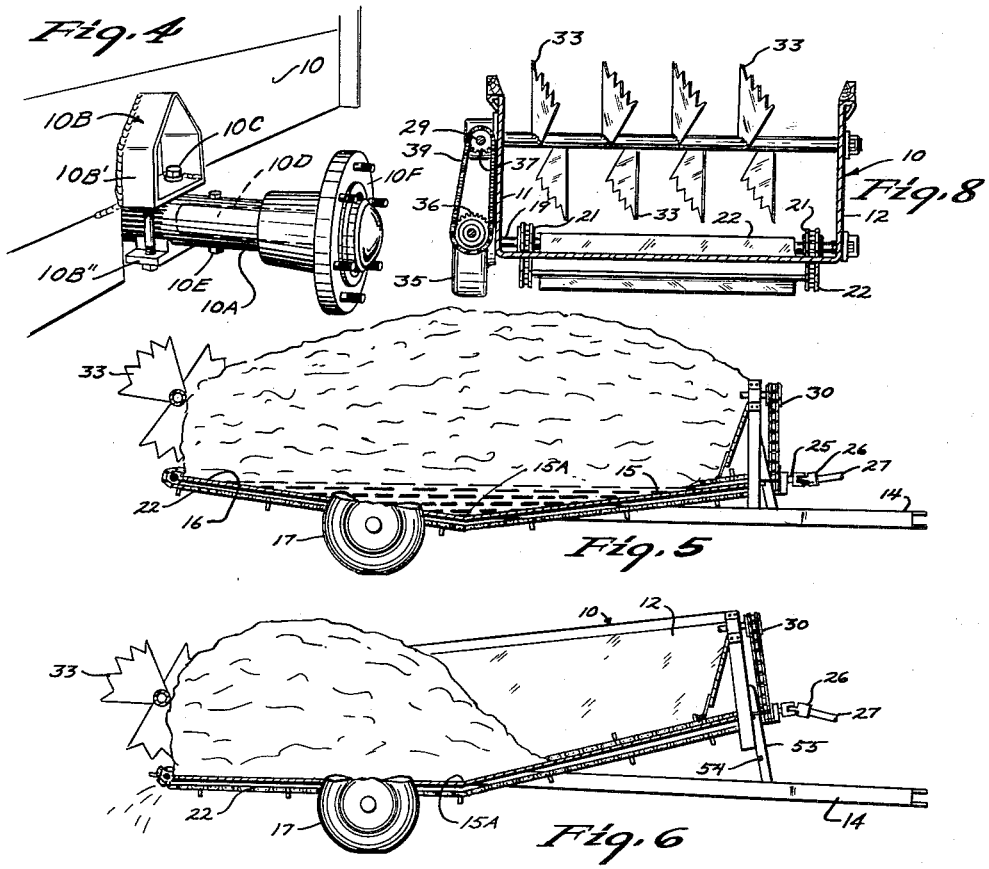
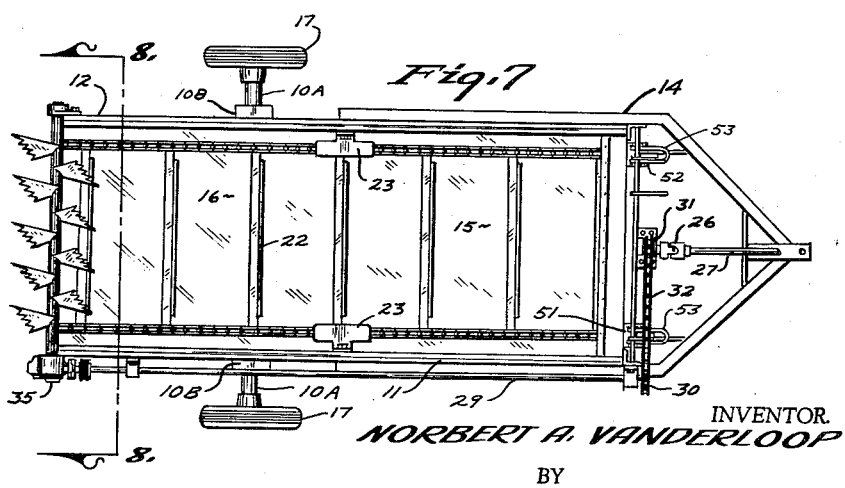
INVENTOR.
NORBERT A. VANDERLOOP
BY
M. Talbert Dick
ATTORNEY
WITNESS
NORMAN G. TRAVISS

United States Patent Office 3,185,326
Patented May 25, 1965

3,185,326
MATERIAL HAULING, MIXING AND SPREADING DEVICE
Norbert A. Vanderloop, R.R. 1, Brillion, Wis.
Filed Jan. 8, 1963, Ser. No. 250,466
6 Claims. (Cl. 214—83.36)

This invention relates to a vehicle that is capable of hauling, mixing and spreading material such as fertilizer. This is a continuation in part of my co-pending application, Serial Number 18,142, filed March 28, 1960, now abandoned.

Hauling and spreading vehicles such as manure spreaders are old. Usually such devices are in the form of a wagon with conveyor means for moving the hauled material out the rear end of the wagon box. Such equipment has two main objections. Firstly, unless an end gate is used, only the front section of the wagon box can be loaded with the material to be hauled and spread. Secondly, if an end gate is used, the operator, usually using a pulling tractor, must stop, dismount from the tractor, and remove the end gate just prior to the spreading phase. Also, there is no way of mixing other ingredients such as water, liquid fertilizer or like with the manure or the like.

Therefore, one of the principal objects of my invention is to provide a material hauling and spreading vehicle that does not need a box end gate to haul a full load of material.

A further object of this invention is to provide a manure or like hauling and spreading implement that may be placed in spreading operation by the operator without dismounting from the pulling tractor.

A still further object of this invention is to provide a fertilizer spreading mechanism that is capable of spreading the material evenly and uniformly throughout the unloading operation.

A still further object of this invention is to provide a fertilizer hauling and spreading device that has a V-shaped bottom in its load carrying box which will automatically tilt in a rearward direction as the load being carried therein is moved in a rearward direction within the box.

A still further object of this invention is to provide a fertilizer hauling and spreading device that has a V-shaped bottom in its load carrying box which will automatically tilt in a rearward direction as the load being carried therein is moved in a rearward direction within the box, and, whereupon the box will become locked in this tilted position.

Still further objects of my invention are to provide a material hauling and spreading device that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIGURE 1 is a side view of my material hauling, mixing and spreading implement;

FIGURE 2 is an enlarged side sectional view of the box trip mechanism taken on line 2—2 of FIGURE 3;

FIGURE 3 is a front end perspective view of the device more fully illustrating its construction.

FIGURE 4 is a perspective view of the axle of my device showing its rigid attachment to the box;

FIGURE 5 is a longitudinal sectional view of my device showing how liquids are retained in the box under loaded conditions;

FIGURE 6 is a view of my device similar to that of FIGURE 5 but shows the tilted position of my device as the load carried therein is moved rearwardly;

FIGURE 7 is a plan view of my device; and

FIGURE 8 is a rear sectional view of my device taken on line 8—8 of FIGURE 7.

The specific construction of the unloading conveyer means and its power means is not important to this invention provided the material is moved out the rear end of the box and further provided it does not interfere with the longitudinal rocking movement of the wagon box. The structure of this wagon box 10 is, however, most important. The box has the two sides 11 and 12, a front end 13. Its bottom, however, is unique in that it extends from its longitudinal center, upwardly and outwardly in both directions as shown in FIGURE 1. From the longitudinal center bottom-most point the floor at 15 extends relatively upwardly and forwardly and from this center bottom-most point 15A and the floor at 16 extends relatively upwardly and rearwardly. Thus, the bottom area of the box 10, is in the form of a horizontal one-half diamond. The numeral 14 designates a horizontal U-shaped pulling frame with its two ends extending rearwardly and pivoted by any suitable means to the bottom center length of the box 10 as best shown in FIGURE 3. The forward end of this frame 14 is adapted to be secured to the draw bar of a tractor (not shown). By this construction the box 10 may rock backwardly or forwardly on its pivot point of connection with the rear ends of the frame 14. An axle housing 10A extends in a lateral direction underneath the floor at 16 and is rigidly secured thereto by saddles 10B which are welded to the sides of the box 10 at a point rearwardly of the bottom-most point 15A of the box. Nut and bolt assemblies 10C extend adjacent axle housing 10A to effect the rigid connection of the housing between the upper and lower portions 10B' and 10B'', respectively, of the saddles 10B. Stub axles 10D extend into each end of axle housing 10A and are rigidly held therein by nut and bolt assemblies 10E which extend through the axles and axle housing. A hub 10F is rotatably mounted on the outer end of each of the axles 10D, and a support wheel 17 is secured in conventional fashion to each of these hubs. In the drawings only one of these wheels and related structure are shown, it being understood that a like wheel is rotatably mounted at the other side of the box.

Similar to that of ordinary manure spreaders I have rotatably mounted a shaft 19 and 20 at each bottom end respectively of the box. These shafts each have sprocket wheels 21 which in turn carry an endless chain conveyer 22. This conveyer embraces the top and bottom of the box floor and is required to follow the outline of the box floor by any suitable means such as adjustable holding brackets 23 as shown in FIGURE 3. Rotatably mounted in the front end of the box is a stub shaft 25. A universal joint 26 connects this shaft with a second shaft 27, which is adapted to be connected to the power take off of the pulling tractor. The numeral 29 designates a shaft rotatably mounted on the side of the box. The numeral 30 designates a sprocket wheel on the shaft 29 and the numeral 31 a sprocket wheel on the shaft 25. These two sprocket wheels are connected by an endless chain 32. The shaft 29 is operatively connected to material removing and scattering elements 33 rotatably mounted in the rear open end area of the box and which is positioned above the chain conveyer. The numeral 35 designates a gear reduction means operatively connected to the shaft 19. This reduction gear means has a sprocket wheel 36. The numeral 37 designates a sprocket wheel on the shaft 29. The sprocket wheels 36 and 37 are connected by an endless chain 39. By this arrangement of parts, when the operator connects the power take off of his tractor, the chain conveyer will have its upper side above the box floor, slowly moving to the rear, and the scattering elements will rotate to the right and cast material brought to them by the conveyer, out of the rear end of the box. The bottom floor area 16 of the box may move from a plane slightly below the horizontal to a plane extending rearwardly and upwardly and the bottom floor area 15 of the box may also move from a lowered position to a plane extending upwardly and forwardly as shown by broken lines in FIGURE 1. Obviously, when the floor area 16 is substantially horizontal, the floor area 15 will be extending forwardly and upwardly. When loading and hauling the material, and in the initial stages of unloading the floor area 15 should be in a lowered horizontal plane position, or with both floor areas 15 and 16 extending upwardly and away from each other as shown in FIGURE 1. When the box is in such a position, it will hold any material and may be loaded to capacity. Also when in such position, necessary mixing liquids are to be placed in the box before and below the main mass of material. A ledge 50 is at the front bottom of the box to aid in the retaining of liquid in the lower part of the box.

Some means, however, is necessary to hold the rocking wagon box against movement, and this is especially true during the loading and hauling phase; therefore, on the forward bottom end of the box I have provided two spaced apart horizontal tongues 51 and 52. Loops 53 are welded to and extend forwardly from each tongue. The numerals 55 and 56 designate two spaced apart vertical arms each having its lower end hinged to the frame 14. These arms extend upwardly adjacent the forward ends of the tongues 51 and 52, respectively, and through a loop retainer 53 as shown in FIGURE 3. Each arm has a lower notch 54 and an upper notch 57, either of which may be selectively entered and engaged by the adjacent tongues. The numeral 59 designates a spring means for yieldingly urging each of the arms toward its adjacent tongue. Obviously, when the tongues are engaging the lower notches 54, the wagon box will be held so that its rear bottom 16 will extend upwardly and rearwardly (FIGURE 5), but when the tongues are in engagement with the upper notches 57, the rear bottom 16 of the box will be extending rearwardly in a substantially horizontal plane (FIGURE 6). It will be noted that the pivot point for box 10 as it moves from the position of FIGURE 5 to that of FIGURE 6 is provided by the axles 10D. The numeral 60 designates a cross-shaft rotatably mounted on the front end of the box 10. On this shaft normally extending downwardly and back of each arm is a bar 61. The numeral 62 designates a downwardly extending lever on the shaft 60 and which is adapted to be connected to a rope or like (not shown) but which is to extend to the operator on the tractor. When this lever is pulled forwardly, the shaft 60 will be rotated, thereby bringing the bars 61 forwardly and moving the arms forwardly of the tongues and out of contact with the tongues. When the arms are in such forward positions the box will be in unlocked condition and may rock on its pivotal axis, namely, the longitudinal axis of axles 10D. Stops 65 are at the top of the arms for limiting the upward swinging movement of the forward end of the box. The downward swinging movement of the front end of the box is limited by the frame 14. Initially, and due to weight distribution and the position of the wheels 17, the rear bottom end 16 of the box 10 will extend rearwardly and upwardly and the tongues will be engaging the lower notches 54 of the arms. Thus the box will be positioned and locked. During the unloading operation, if there be any liquid matter in the center bottom of the box, the conveyer will pick up some of it along with some of the other material, mix it with the other material in the process of picking it up, and move the mixed material toward the rear end of the box. There comes a time, however, when it is desired that the rear end of the box be positioned so as to extend horizontally rearwardly with its forward end extending upwardly and forwardly. Also at this time much of the material in the forward end of the box has moved to the rear of the box and, therefore, the rear end of the box by gravity tends to rock the front end of the box upwardly about the longitudinal axis of axles 10D. To permit this it is merely necessary to release the lock means and permit the front end of the box to raise. This moves the rear bottom 16 of the box to a substantially horizontal plane (see FIGURE 6) and all material will be successfully removed from the box 10. The tongues will then be engaging the upper notches 57 and the box will be held in this locked position until the locking means is released. The bottom of the box obviously should be liquid tight. The hinge movement of the box should be sufficient to permit any and all liquid to drain therefrom when the bottom 16 is in its substantially horizontal position. This is most important for preventing deterioration and/or the freezing of liquids in the box when not in use.

Some changes may be made in the construction and arrangement of my material hauling, mixing and spreading device without departing from the real spirit and purpose of my invention, and it is my intention to cover by my claims, any modified forms of structure or use of mechanical equivalents which may be reasonably included within their scope.

I claim:

1. A hauling and spreading device, comprising in combination, a box member having two vertical sides and a fluid tight floor, the forward section of said floor disposed so as to extend at an angle to the rear section of said floor, an axle secured to the box and positioned to the rear of the point of angle in said floor, a wheel disposed on each side of said box and journalled on said axle, said box being tiltable forwardly about the axis of the axle, said box having a normal first position when the box is empty or substantially uniformly loaded along its length to locate both said forward and rear sections at an acute angle with respect to a horizontal plane, conveying means disposed above the floor for conveying material toward the rear of the box, and said box being tiltable rearwardly about the axis of the axle to a second position in response to the shifting of the center of gravity of the load to the rear of the axle to thereby position said rear section in a substantially horizontal plane and allow liquids to drain from said box, supporting frame means hingedly secured to the box and extending forwardly therefrom and adapted to be secured to a pulling vehicle, and means responsive to a given degree of tilt of said box in a rearward direction for detachably locking said box in said second position and maintaining said rear section of the floor in a substantially horizontal plane.

2. A hauling and spreading device comprising in combination, a box member having a V-shaped floor, closed at a front end and open at a rear end, conveyer means movable from said front end over said floor to said rear end, ground engaging wheel means mounted beneath said box member and rearwardly of the apex of said floor, discharge means mounted on said box member at the rear end thereof and adapted to move material outwardly therefrom, frame means hingedly connected to said box member on either side thereof, substantially at said apex whereby said box member is freely rockable with respect to said frame means, said frame means adapted to be releasably connected to a prime mover, tongue means secured to the front end of said box member and extended forwardly therefrom, a shaft mounted transversely across said front end and having bar means depending therefrom, said shaft rotatable in a manner to swing said bar means upwardly and outwardly, a pair of arms hingedly connected to said frame means and extended upwardly in front of said shaft, said tongue means and said bar means.

said arms each having at least a pair of vertically spaced notches formed therein which are adapted to receive said tongue means therein, spring means connected between said arms and said frame means to bias said arms into continued contacting engagement with said tongue means, and a lever attached to said shaft and movable to rotate said bar means against said arms to move said arms away from engagement of one notch in each arm by said tongue means, whereby upon more material being in one end of said box member than in the other end, said box member is automatically tiltable until said tongue means engages another notch in each arm.

3. A hauling and spreading device, comprising in combination, a box having two sides and a fluid tight floor, the forward section of said floor disposed so as to extend at an angle to the rear section of said floor, an axle secured to the box and positioned to the rear of the point of angle in said floor, a rotatable wheel disposed on each side of the box and connected to said axle, said box being tiltable forwardly about the axis of the axle, said box having a normal first position when the box is empty or substantially uniformly loaded along its length to locate said forward and rear sections at an acute angle with respect to a horizontal plane, and said box being tiltable rearwardly about the axis of the axle to a second position in response to the shifting of the center of gravity of the load of material contained in the box to the rear of the axle to thereby position said rear section in a substantially horizontal plane and allow liquids to drain from said box, supporting frame means hingedly secured to the box and extending forwardly therefrom and adapted to be secured to a pulling vehicle, conveying means disposed above the floor for conveying material toward the rear of the box, and locking means located at the front of the box for locking the box with respect to said frame means, said locking means having a first locking position corresponding to the first position of said box and having a second locking position corresponding to said second position of the box.

4. A hauling and spreading device, comprising in combination a box having two sides and a fluid tight floor, the forward section of said floor disposed so as to extend at an angle to the rear section of said floor, an axle secured to the box and positioned to the rear of the point of angle in said floor, a rotatable wheel disposed on each side of the box and connected to said axle, said box being tiltable forwardly about the axis of the axle, said box having a normal first position when the box is empty or substantially uniformly loaded along its length to locate said forward and rear sections at an acute angle with respect to a horizontal plane, and said box being tiltable rearwardly about the axis of the axle to a second position in response to the shifting of the center of gravity of the load of material contained in the box to the rear of the axle to thereby position said rear section in a substantially horizontal plane and allow liquids to drain from said box, supporting frame means hingedly secured to the box and extending forwardly therefrom and adapted to be secured to a pulling vehicle, conveying means disposed above the floor for conveying material toward the rear of the box, a first locking member associated with the box, a second locking member associated with said frame means and engageable with the first locking member to lock the box to said frame means, resilient means for biasing said second locking member into engagement with said first locking member, and means extending forwardly of said box and disposed to be actuated by the driver of said pulling vehicle for acting against the force of said resilient means and releasing engagement of said locking members to permit the box to tilt by gravity.

5. A hauling and spreading device, comprising in combination, a box member having two vertical sides and a fluid tight floor, the forward section of said floor disposed so as to extend at an angle to the rear section of said floor, an axle secured to the box and positioned to the rear of the point of angle in said floor, a wheel disposed on each side of said box and journalled on said axle, said box being tiltable forwardly about the axis of the axle, said box having a normal first position when the box is empty or substantially uniformly loaded along its length to locate both said forward and rear sections at an acute angle with respect to a horizontal plane, conveying means disposed above the floor for conveying material toward the rear of the box, and said box being tiltable rearwardly about the axis of the axle to a second position in response to the shifting of the center of gravity of the load to the rear of the axle to thereby position said rear section in a substantially horizontal plane and allow liquids to drain from said box, and supporting frame means hingedly secured to the box and extending forwardly therefrom and adapted to be secured to a pulling vehicle.

6. A hauling and spreading device comprising in combination, a box member having a V-shaped floor, closed at a front end and open at a rear end, conveyor means movable from said front end over said floor to said rear end, ground engaging wheel means mounted beneath said box member and rearwardly of the apex of said floor, discharge means mounted on said box member at the rear end thereof and adapted to move material outwardly therefrom, frame means hingedly connected to said box member at the forward end thereof whereby said box member is freely rockable with respect to said frame means, said frame means adapted to be releasably connected to a prime mover, tongue means secured to the front end of said box member and extended forwardly therefrom, a shaft mounted transversely across said front end and having bar means depending therefrom, said shaft rotatable in a manner to swing said bar means upwardly and outwardly, at least one arm hingedly connected to said frame means and extended upwardly in front of said shaft, said tongue means and said bar means, said arm having at least a pair of vertically spaced notches formed therein which are adapted to receive said tongue means therein, spring means connected between said arm and said frame means to bias said arm into continued contacting engagement with said tongue means, and a lever attached to said shaft and movable to rotate said bar means against said arm to move said arm away from engagement of one notch in said arm by said tongue means, whereby upon more material being in one end of said box member than in the other end, said box member is automatically tiltable until said tongue means engages another notch in each arm.

References Cited by the Examiner

UNITED STATES PATENTS

| | | | |
|---|---|---|---|
| 911,191 | 2/09 | Wortman | 105—263 |
| 1,079,780 | 11/13 | Longest | 298—8 |
| 2,360,126 | 10/44 | Griffiths | 275—5 |
| 2,624,484 | 6/53 | Dalton | 214—505 X |
| 2,744,643 | 5/56 | Hipp | 214—506 |
| 2,803,362 | 8/57 | Saenz | 214—506 |
| 2,885,209 | 5/59 | Bruecker. | |
| 3,010,726 | 11/61 | Smoker et al. | |

HUGO O. SCHULZ, *Primary Examiner.*

GERALD M. FORLENZA, *Examiner.*